US012296358B2

(12) United States Patent
Matsumoto et al.

(10) Patent No.: US 12,296,358 B2
(45) Date of Patent: May 13, 2025

(54) POWDER COATING DEVICE AND POWDER COATING METHOD

(71) Applicant: HONDA MOTOR CO., LTD., Tokyo (JP)

(72) Inventors: Hiroaki Matsumoto, Tokyo (JP); Muneki Yamada, Tokyo (JP); Kenji Masai, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 259 days.

(21) Appl. No.: 17/661,048

(22) Filed: Apr. 28, 2022

(65) Prior Publication Data

US 2023/0001446 A1 Jan. 5, 2023

(30) Foreign Application Priority Data

Jun. 30, 2021 (JP) ................................ 2021-108636

(51) Int. Cl.
*B05D 1/24* (2006.01)
*B05C 3/05* (2006.01)
*B05C 19/02* (2006.01)

(52) U.S. Cl.
CPC .................. *B05D 1/24* (2013.01); *B05C 3/05* (2013.01); *B05C 19/02* (2013.01)

(58) Field of Classification Search
CPC ...................................................... B05C 19/02
See application file for complete search history.

(56) References Cited

U.S. PATENT DOCUMENTS 5,876,265 A * 3/1999 Kojima ................. B24B 37/042
438/692
2019/0134661 A1* 5/2019 Nakajima ............. B05C 19/008

FOREIGN PATENT DOCUMENTS

| | | | |
|---|---|---|---|
| CN | 109759292 | A | 5/2019 |
| JP | S6066964 | A | 4/1985 |
| JP | H1199355 | A | 4/1999 |
| JP | 2002282669 | A | * 10/2002 |
| JP | 6596477 | B2 | 10/2019 |
| TW | I276608 | B | 3/2007 |

OTHER PUBLICATIONS

JP2002-282669, machine translation. (Year: 2002).*
Notification of Reasons for Refusal issued in the JP Patent Application No. 2021-108636, mailed on Feb. 21, 2023.
Office Action issued Mar. 20, 2025 in the CN Patent Application No. 202210457525.2.

* cited by examiner

*Primary Examiner* — Robert A Vetere
(74) *Attorney, Agent, or Firm* — CKC & Partners Co., LLC

(57) ABSTRACT

Provided is a powder coating device including a powder fluidization tank including a bottom member having a plurality of spacers interposed between a first plate member and a second plate member, a fixing member to which the powder fluidization tank is fixed, a coupling support member coupling and supporting the first plate member to the fixing member, and a vibration mechanism coupled to the first plate member, wherein the coupling support member includes an elastic member.

3 Claims, 8 Drawing Sheets

SIMPLE GEOMETRIC MODEL

SIMPLE GEOMETRIC MODEL

POWDER COATING DEVICE AND POWDER COATING METHOD

This application is based on and claims the benefit of priority from Japanese Patent Application No. 2021-108636, filed on 30 Jun. 2021, the content of which is incorporated herein by reference.

BACKGROUND OF THE INVENTION

Field of the Invention

The present invention relates to a powder coating device and a powder coating method.

Related Art

Conventionally, when coating insulating powder onto a coil end of a stator which is a component of a motor installed in a vehicle, a fluidized bed coating process is used.

Patent Document 1 discloses a powder resin coating device including a powder fluidization tank having a first partition plate and a second partition plate as porous plates, a vibration mechanism connected to a bottom surface of the powder fluidization tank, and a support member connecting the powder fluidization tank and a fixing surface, wherein the support member elastically supports the powder fluidization tank to the fixing surface.

Patent Document 1: Japanese Patent No. 6596477

SUMMARY OF THE INVENTION

However, as illustrated in FIG. 1, as a distance in a Y-axis direction (horizontal direction) from the axis line of the powder coating device increases, the amplitude in a Z-axis direction (axis line direction) also increases. This results in a large difference in blockage rate between pores at the central portion and at the outer peripheral portion of the second partition plate, causing a radial flow in the powder surface. This may cause a boundary between a coated area and an uncoated area to become diffuse. The amplitude can be measured using a sensor at a predetermined frequency and a predetermined excitation force.

The present invention has an object of providing a powder coating device capable of suppressing an increase in amplitude in the axial direction even with a great distance in the horizontal direction from the axis line.

According to an aspect of the present invention, a powder coating device includes: a powder fluidization tank including a bottom member having a plurality of spacers interposed between a first plate member and a second plate member; a fixing member to which the powder fluidization tank is fixed; a coupling support member coupling and supporting the first plate member to the fixing member; and a vibrator coupled to the first plate member, wherein the coupling support member includes an elastic member.

The aforementioned powder coating device may further include a weight, and the first plate member may be sandwiched between the vibrator and the weight.

The vibrator may include a vibrator body and a coupler coupling the vibrator body to the first plate member, and the vibrator body may include a vibration motor having an eccentric rotation shaft.

According to another aspect of the present invention, a powder coating method includes coating a workpiece with a resin powder using the powder coating device described above.

According to the present invention, it is possible to provide a powder coating device capable of suppressing an increase in amplitude in the axial direction even with a great distance in the horizontal direction from the axis line.

DETAILED DESCRIPTION OF THE INVENTION

An embodiment of the present invention is described below with reference to the drawings.

[Powder Coating Device]

Figure 2:
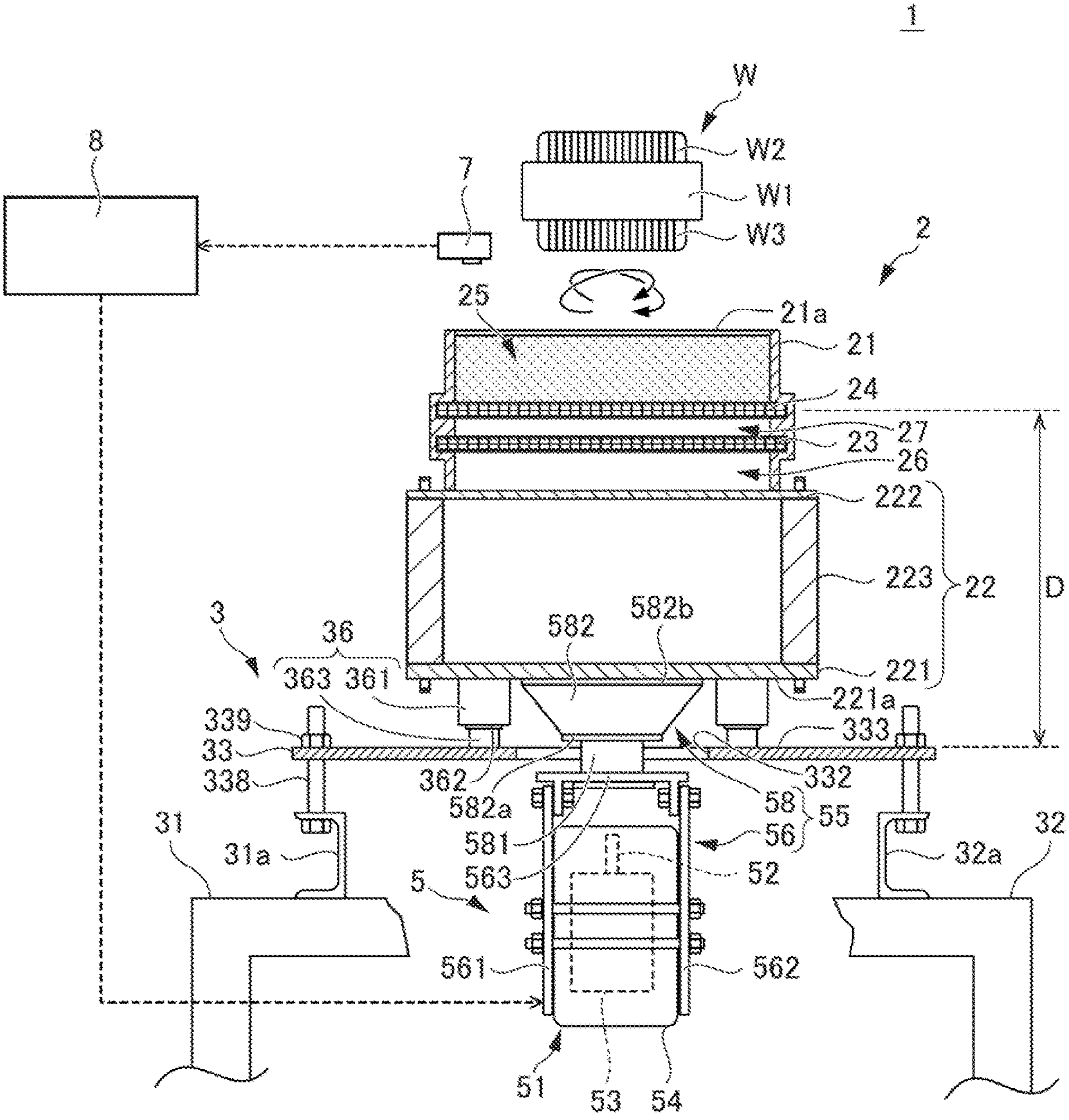
FIG. 2 illustrates an example of a powder coating device according to an embodiment of the present invention.

FIG. 2 illustrates an example of a powder coating device according to the present embodiment.

A powder coating device 1 coats a workpiece with a resin powder using a fluidized bed coating process. The powder coating device 1 includes a powder fluidization tank 2, a stand 3 that supports the powder fluidization tank 2 on a placement surface, a vibration mechanism 5 coupled to a bottom member 22 of the powder fluidization tank 2, a level meter 7 that detects a powder surface height in the powder fluidization tank 2, and a control device 8 that controls the vibration mechanism 5.

Described below is a case in which a stator W which is a component of a motor installed in a vehicle is used as the workpiece and an insulating powder is used as a resin powder. However, the workpiece and the resin powder are not so limited. Resins that may constitute the insulating powder include, for example, epoxy resin, etc.

The stator W includes a cylindrical stator core W1 and a stator coil W2 wound in a plurality of slots formed inside the stator core W1. Here, a lower end of the stator coil W2 is a coil end W3 to be coated with insulating powder.

Figure 3:
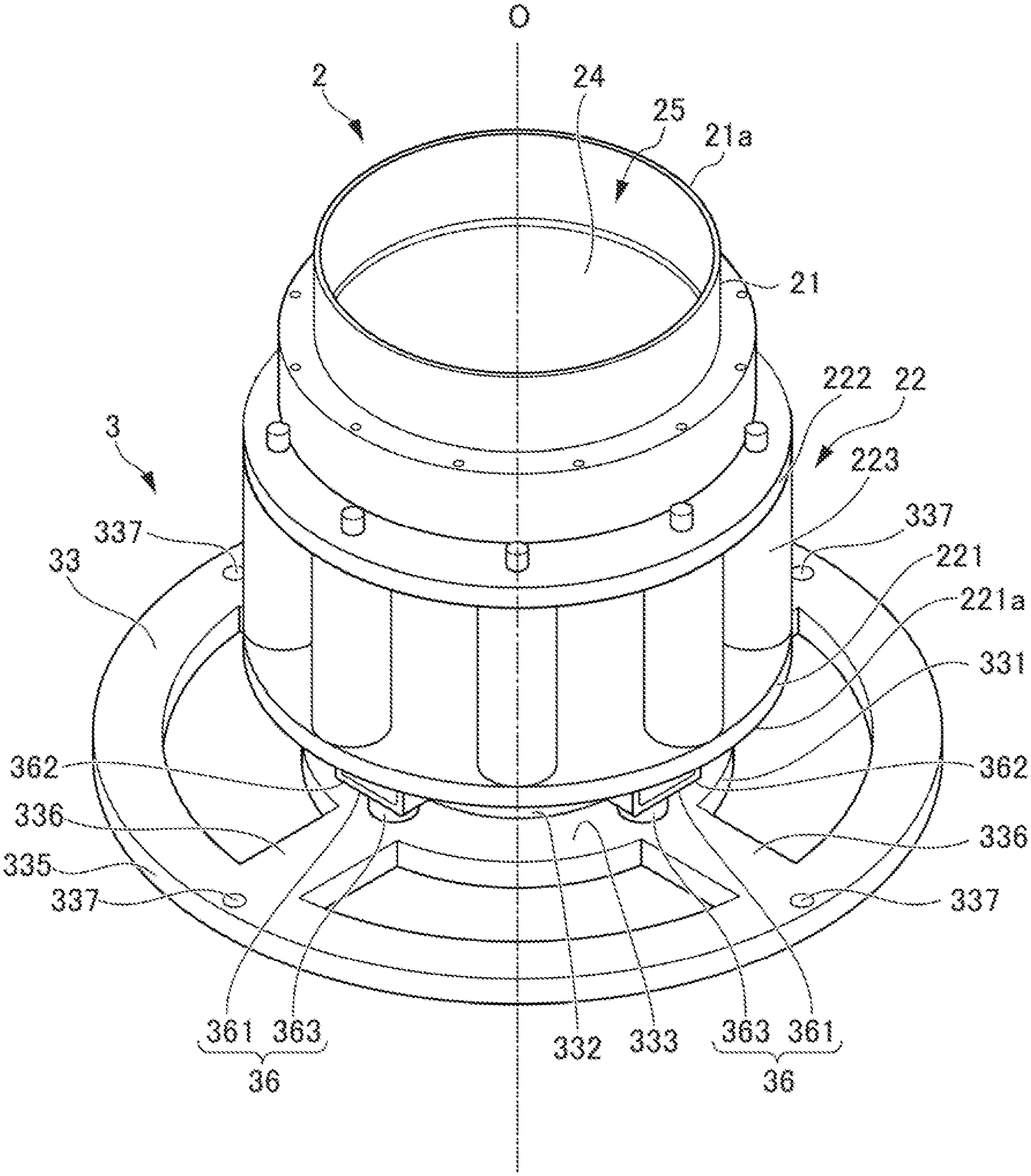
FIG. 3 illustrates a powder fluidization tank and a stand of the powder coating device of FIG. 2.

FIG. 3 illustrates the powder fluidization tank 2 and the stand 3 of the powder coating device 1.

The powder fluidization tank 2 is approximately circular in a top view. The powder fluidization tank 2 includes a cylindrical trunk 21, an approximately disc-shaped bottom member 22, a first partition plate 23 and a second partition plate 24 that are approximately disc-shaped and provided inside of the trunk 21, and a powder storage unit 25 where insulating powder is stored. Here, the first partition plate 23 and the second partition plate 24 are porous plates in which there are formed through holes each having a diameter smaller than the particle size of the insulating powder.

Figure 4A:
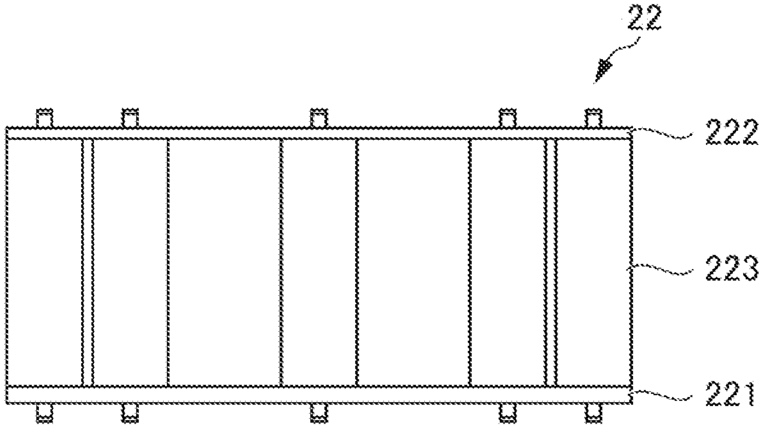
FIGS. 4A and 4B illustrate an example of a bottom member of FIG. 2.
Figure 4B:
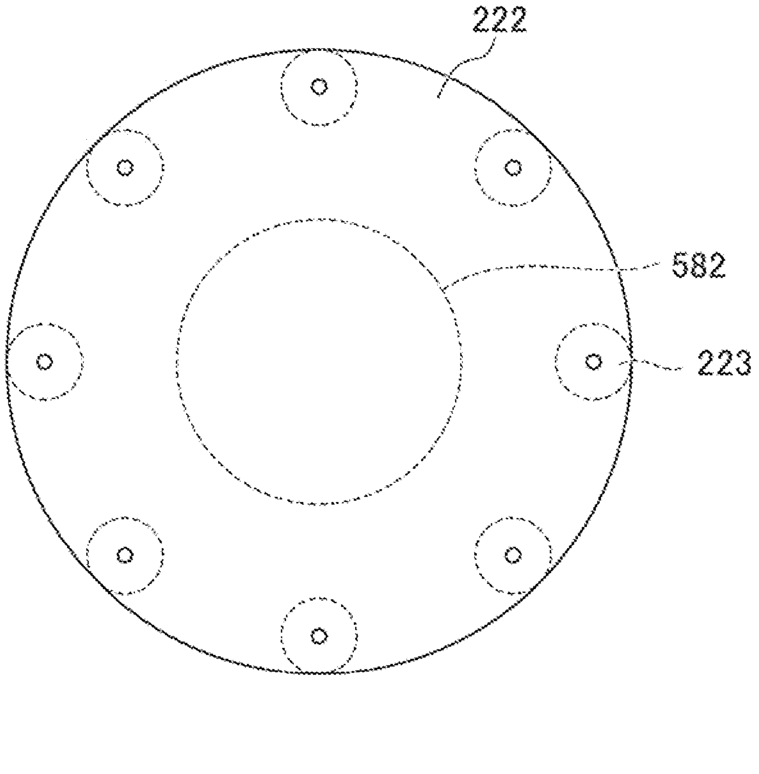

As illustrated in FIGS. 4A and 4B, in the bottom member 22, eight spacers 223 are interposed between outer peripheral portions of a first plate 221 and a second plate 222. FIGS. 4A and 4B respectively illustrate a side view and a front view. Here, the eight spacers 223 are arranged at equal intervals.

Materials that may constitute the spacers 223 include, for example, rigid materials such as stainless steel, etc.

Figure 1:
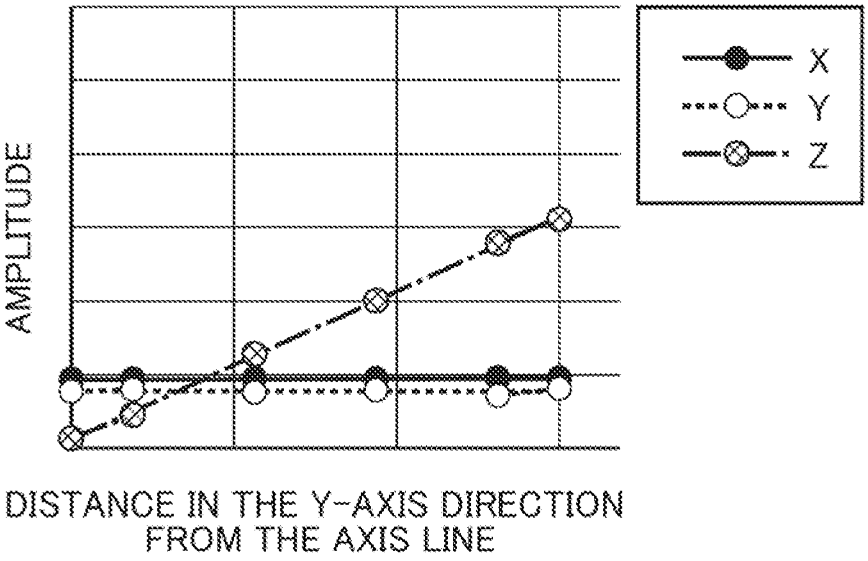
FIG. 1 illustrates measurement results of amplitude distribution in a powder fluidization tank of a conventional powder coating device.
Figure 5:
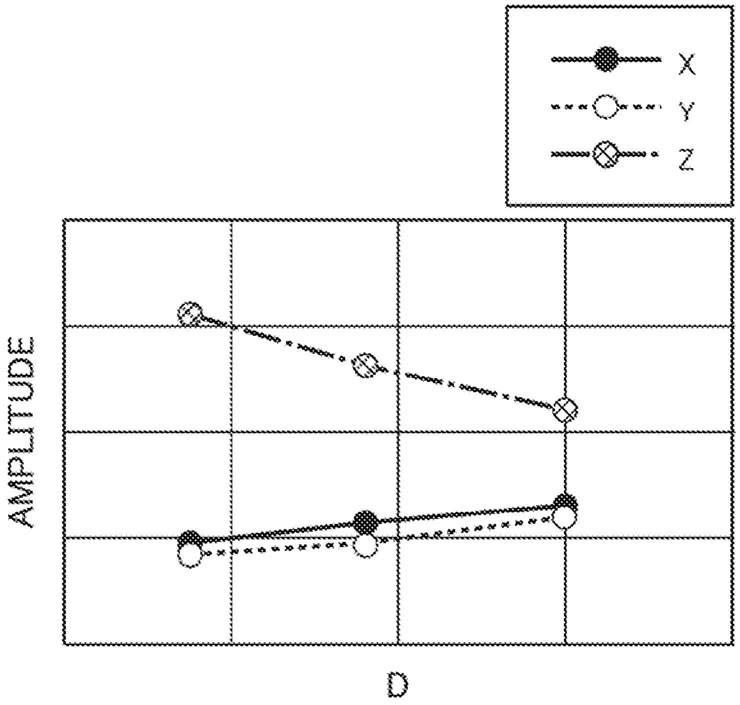
FIG. 5 illustrates measurement results of amplitude distribution in the powder fluidization tank of the powder coating device of FIG. 2.

Using a sensor mounted to an edge part 21*a* of the trunk 21 to measure the amplitude with a predetermined frequency and a predetermined excitation force, the amplitude in the Z-axis direction (axis line O direction) decreases as a distance D between a fixed plate 33 and the powder storage unit 25, that is, the height of the spacers, increases, as illustrated in FIG. 5. Therefore, even if the distance from the axis line C in the Y-axis direction (horizontal direction) is great, an increase in amplitude in the Z-axis direction (axial direction) can be suppressed. This results in a smaller difference in blockage rate between pores at the central portion and at the outer peripheral portion of the second partition plate 24, making radial flow in the powder surface less likely to occur. In addition, the amplitude in the X-axis direction and the Y-axis direction (horizontal directions) is large, and therefore the insulating powder can be sufficiently fluidized. Here, the amplitude in FIG. 5 is the amplitude at the point in FIG. 1 where the distance from the axis line in the Y-direction is greatest (the rightmost point), and the leftmost point in FIG. 5 represents a case in which spacers are not provided. The same tendency of the amplitude at the point in FIG. 1 where the distance in the Y-axis direction from the axis line is greatest was also observed for other points in FIG. 1.

It should be noted that so long as the bottom member 22 has a plurality of spacers interposed between a first plate member and a second plate member, it is not particularly limited. For example, the spacers 223 may be interposed between the first plate 221 and the second plate 222 at regions other than the outer peripheral portions. In addition, the number of spacers 223 is not particularly limited.

Figure 6A:
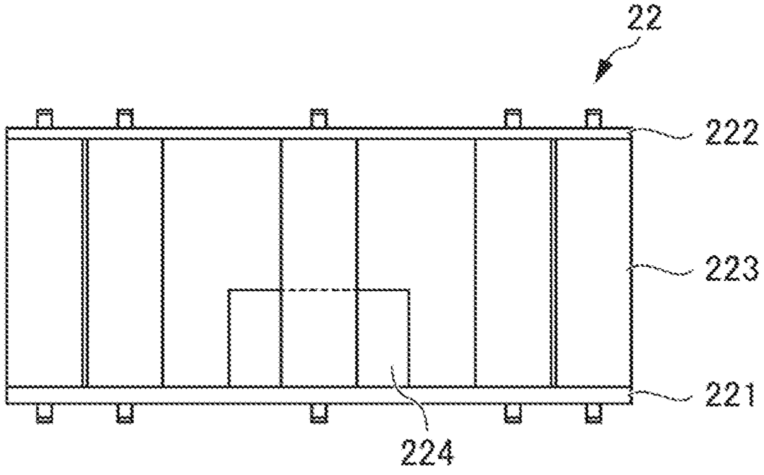
FIGS. 6A and 6B illustrate another example of the bottom member of FIG. 2.
Figure 6B:
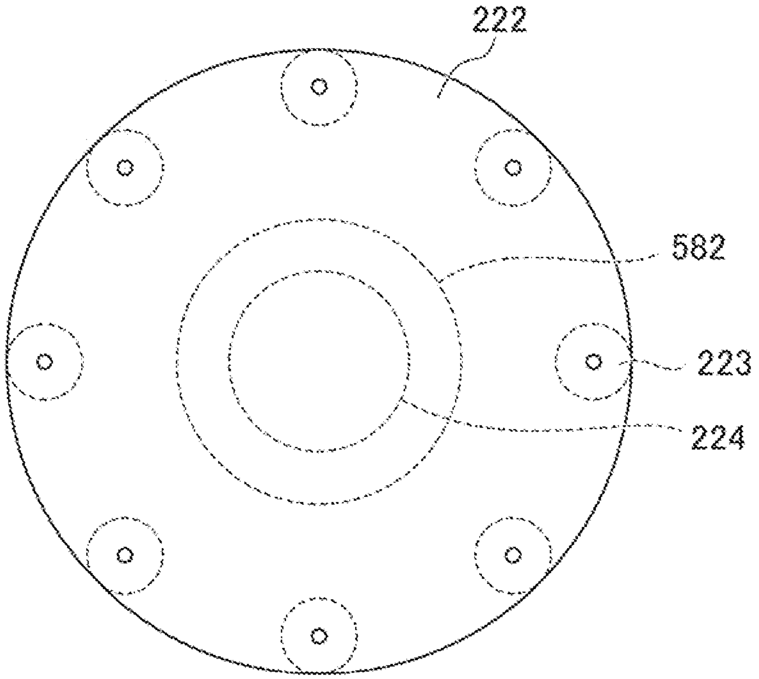
Figure 7:
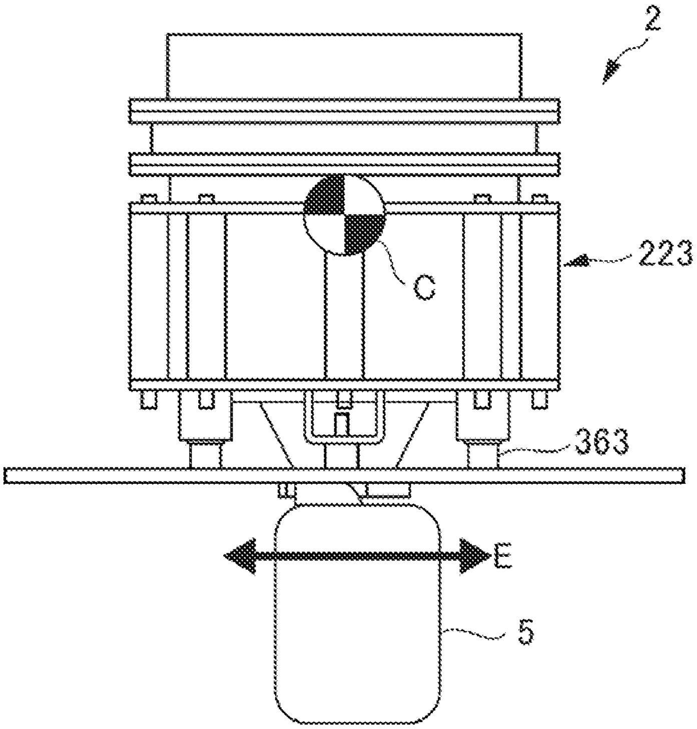
FIG. 7 illustrates a simple geometric model corresponding to the bottom member of FIGS. 4A and 4B.
Figure 7:
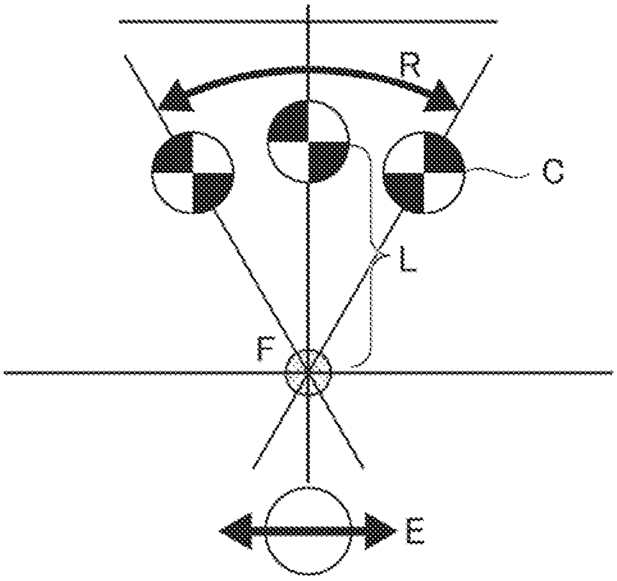
Figure 8:
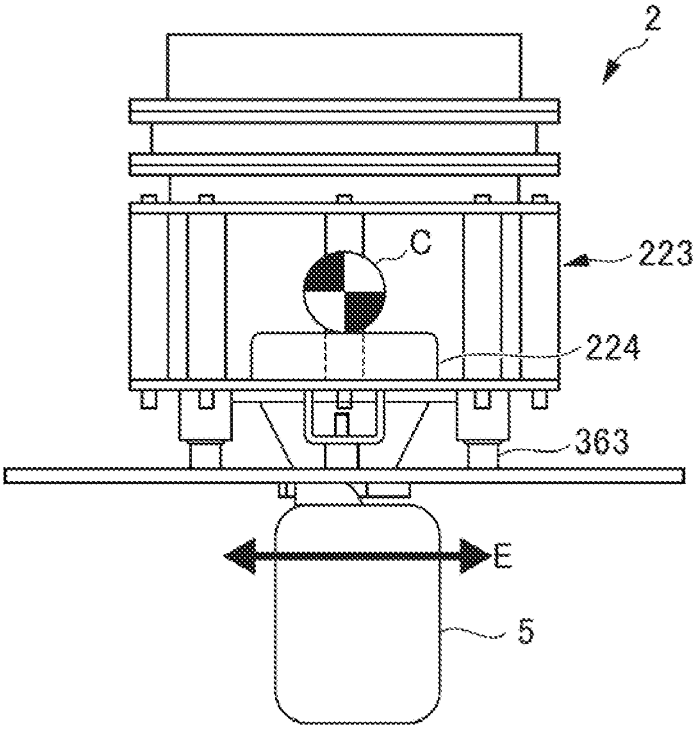
FIG. 8 illustrates a simple geometric model corresponding to the bottom member of FIGS. 6A and 6B.
Figure 8:
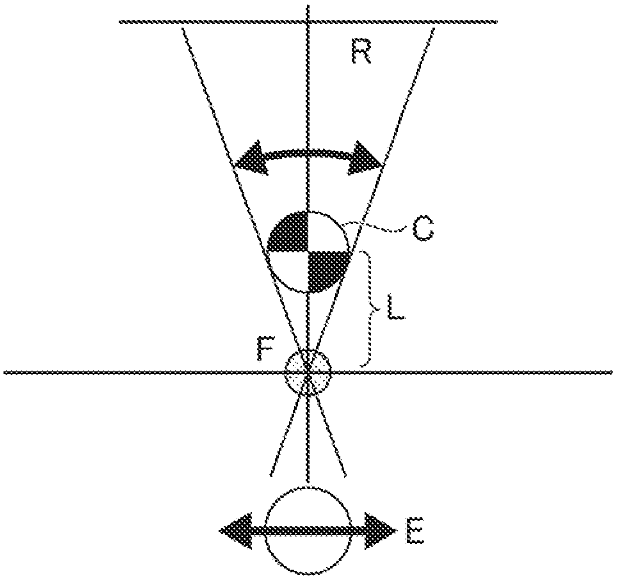

As illustrated in FIGS. 6A and 6B, a weight 224 may be provided on the first plate 221, whereby the first plate 221 is sandwiched between the weight 224 and a connection part 582 of the vibration mechanism 5. When an excitation force E is applied by the vibration mechanism 5, displacement occurs centered around a center of gravity C of the powder fluidization tank 2, with elastic members 363 as fulcrums, and by providing the weight 224, the center of gravity C of the powder fluidization tank 2 is lowered (see FIG. 7 and FIG. 8). At this time, as illustrated by the simple geometric models, the excitation force E is identical, and therefore a displacement R will be smaller the lower the center of gravity C of the powder fluidization tank 2 is; in other words, the shorter a distance L between a fulcrum F and the center of gravity C is. This further reduces the amplitude in the Z-axis direction (axis line O direction), resulting in an even smaller difference in blockage rate between pores at the central portion and at the outer peripheral portion of the second partition plate 24.

The powder storage unit 25 is defined by the edge part 21*a* of the trunk 21 and the second partition plate 24. In addition, a first air chamber 26 is formed by the space demarcated by the second plate 222 and the first partition plate 23, and a second air chamber 27 is formed by the space demarcated by the first partition plate 23 and the second partition plate 24. In addition, the first air chamber 26 is supplied with air at a predetermined rate from an air supply device. The air supplied into the first air chamber 26 flows into the second air chamber 27 via the first partition plate 23, then flows into the powder storage unit 25 via the second partition plate 24. As a result, the insulating powder stored inside the powder storage unit 25 fluidizes.

The stand 3 includes a plurality of fixed frames 31 and 32, the fixed plate 33, and a plurality of coupling support members 36. Here, four coupling support members 36 are provided on the side of the axis line) with respect to the trunk 21, and the four coupling support members 36 are arranged at equal intervals.

The lower ends of the fixed frames 31, 32 are respectively fixed to installation surfaces.

The fixed plate 33 is substantially disc-shaped in a top view, and is provided substantially coaxially with the axis line O. The fixed plate 33 includes an annular small-diameter plate 331 having a diameter substantially equal to that of the powder fluidization tank 2, a large-diameter plate 335 having a diameter larger than that of the small-diameter plate 331, and connection plates 336 which connect the small-diameter plate 331 to the large-diameter plate 335. A through hole 332 for inserting the vibration mechanism 5 is formed in the small-diameter plate 331. In addition, a plurality of through holes 337 are formed in the large-diameter plate 335 in order to fix the large-diameter plate 335 to the fixed frames 31 and 32 using nuts and bolts.

The fixed frames 31 and 32 respectively have, formed at the upper ends thereof, fixing parts 31*a* and 32*a*, and in the upper ends of the fixing parts 31*a* and 32*a* are formed through holes for fixing the fixed plate 33 using nuts and bolts.

The fixed plate 33 is fixed to the fixing parts 31*a* and 32*a* by bolts 338 and nuts 339, such that a fixing surface 333 of the small-diameter plate 331 on the side fixing the powder fluidization tank 2 becomes horizontal.

The coupling support members 36 couple and support the first plate 221 of the bottom member 22 to the small-diameter plate 331 of the fixed plate 33. Each coupling support member 36 includes a leg portion 361 fixed to a bottom surface 221*a* of first plate 221, and an elastic member 363 which is interposed between a bottom surface 362 of the leg portion 361 and the fixing surface 333 of the small-diameter plate 331. For example, a rubber member is used as the elastic member 363.

The vibration mechanism 5 includes a vibration unit 51 serving as a columnar vibrator body, and a coupling mechanism 55 that couples the vibration unit 51 to the first plate 221 of the bottom member 22.

The vibration unit 51 includes a vibration motor 53 having a rotation shaft 52, and a housing 54 which houses the vibration motor 53. The vibration motor 53 causes the rotation shaft 52 to rotate at a frequency according to a control signal from the control device 6. The housing 54 is coupled to the first plate 221 via the coupling mechanism 55 so as to become substantially coaxial with the axis line O of the powder fluidization tank 2. In addition, an eccentric weight is attached to the rotation shaft 52. Therefore, when the eccentric rotation shaft 52 is caused to rotate by the vibration motor 53, the housing 54 vibrates. At this time, the housing 54 vibrates such that a center point thereof makes a circular motion centered about the axis line O, within a horizontal plane perpendicular to the axis line O.

The coupling mechanism 55 includes a bracket 56 that retains the housing 54, and a coupling member 58 that is substantially coaxial with the axis line O and couples the bracket 56 to the first plate 221.

The bracket 56 includes a first support plate 561 and a second support plate 562 which are parallel to each other and are parallel to the axis line O, and a third support plate 563 that connects the first support plate 561 and the second support plate 562 and is perpendicular to the axis line O. The first support plate 561 and the second support plate 562 are respectively connected to opposing sides of the housing 54. In addition, the distances from the rotation shaft 52 to the first support plate 561 and to the second support plate 562 are equal. In other words, the housing 54 is sandwiched equally by the first support plate 561 and the second support plate 562, centered about the rotation shaft 52. In addition, the housing 54 is retained by the bracket 56 so as to be positioned below the fixed plate 33.

The coupling member 58 includes a shaft part 581 and a coupling part 582 which are substantially coaxial with the axis line O, and couples the bracket 56 provided below the fixed plate 33 to the first plate 221 provided above the fixed plate 33. The coupling part 582 is of a truncated cone shape, and expands in diameter towards a circular top surface 582*b* on the first plate 221 side from a circular bottom surface 582*a* on the bracket 56 side. The lower end side of the shaft part 581 is fixed to the third support plate 563 of the bracket 56, and the upper end side is fixed to the coupling part 582. In addition, the upper end side of the coupling part 582 is fixed to the first plate 221.

The outer diameter of the circular top surface 582*b* of the coupling part 582 is smaller than the inner diameter of the through hole 332 formed in the small-diameter plate 331 of the fixed plate 33, and the coupling part 58 will thus not contact the fixed plate 33 even when the housing 54 vibrates. Therefore, vibrations occurring in the housing 54 transmit to the powder fluidization tank 2 via the bracket 56 and the coupling part 58 without being dampened by the fixed plate 33.

The level meter 7 is provided above the powder fluidization tank 2. The level meter 7 detects the height of a powder surface in the powder fluidization tank 2 based on, for example, a triangulation method, and sends a signal according to the detected value to the control device 8. Here, the height of the powder surface is a distance from a predetermined reference (for example, the edge part 21*a* of the trunk 21). At this time, the level meter 7 transmits a laser beam from a light source towards a measurement position, and measures the height of the powder surface based on the position at which the laser beam reflected by the powder surface images on a photodetector.

The control device 8 determines a target for the air supply rate of the air supply device and a target for the frequency of the vibration motor 53 according to a predetermined program, and drives the air supply device and the vibration motor 53 so that these targets are realized.

[Powder Coating Method]

A powder coating method according to the present embodiment includes a step of coating a workpiece with a resin powder using the powder coating device according to the present embodiment.

A case of forming an insulating layer on the coil end W3 of the stator W is described below.

The powder coating method according to the present embodiment includes a heating step of heating the stator W, a powder coating step of coating an insulating powder onto the coil end W3 of the stator W using the powder coating device 1, and a reheating step of reheating the stator W having the coil end W3 coated with the insulating powder.

In the heating step, the stator W is heated to a temperature that enables the coil end W3 to fuse the insulating powder.

In the powder coating step, the coil end W3 of the heated stator W is immersed in the powder fluidization tank 2 in which the insulating powder is flowing, and insulating powder is fused onto the coil end W3.

In the reheating step, after removing the stator W having insulating powder fused onto the coil end W3 from the powder fluidization tank 2, the stator W is reheated to form an insulating layer on the coil end W3.

An embodiment of the present invention has been described above, but the present invention is not to be limited thereto. The above embodiment may be modified as appropriate within the scope of the gist of the present invention.

EXPLANATION OF REFERENCE NUMERALS

1 Powder coating device
2 Powder fluidization tank
22 Bottom member
221 First plate
222 Second plate
223 Spacer
224 Weight
3 Stand
33 Fixing plate
36 Coupling supporting member
363 Elastic member
5 Vibration mechanism

What is claimed is:

1. A powder coating device comprising:
a powder fluidization tank including a bottom member having a plurality of spacers interposed between an outer peripheral portion of a first plate member and an outer peripheral portion of a second plate member;
a fixing member to which the powder fluidization tank is fixed;
a coupling support member coupling and supporting the first plate member to the fixing member;
a vibrator coupled to the first plate member; and
a weight provided inside the outer peripheral portion of the first plate member,
wherein the plurality of spacers are rigid members arranged at equal intervals,
wherein the coupling support member includes an elastic member, and
wherein the first plate member is sandwiched between the vibrator and the weight.

2. The powder coating device according to claim 1,
wherein the vibrator comprises a vibrator body and a coupler coupling the vibrator body to the first plate member,
the vibrator body including a vibration motor having an eccentric rotation shaft.

3. A powder coating method comprising coating a workpiece with a resin powder using the powder coating device according to claim 1.

* * * * *